United States Patent
Li et al.

(10) Patent No.: US 7,359,161 B2
(45) Date of Patent: Apr. 15, 2008

(54) MAGNETIC SENSOR THAT COMBINES BOTH CPP AND CIP MODES OF OPERATION

(75) Inventors: Shaoping Li, Naperville, IL (US); Song Xue, Edina, MN (US); Kaizhong Gao, Bloomington, MN (US); Michael R. Montemorra, Longmont, CO (US); Patrick Ryan, St. Paul, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 542 days.

(21) Appl. No.: 10/880,705

(22) Filed: Jun. 30, 2004

(65) Prior Publication Data

US 2006/0002034 A1 Jan. 5, 2006

(51) Int. Cl.
G11B 5/39 (2006.01)

(52) U.S. Cl. .................... 360/324.1; 360/324.2
(58) Field of Classification Search ........... 360/324.1
See application file for complete search history.

(56) References Cited

U.S. PATENT DOCUMENTS

| | | | |
|---|---|---|---|
| 5,287,238 A | 2/1994 | Baumgart et al. | 360/113 |
| 5,301,079 A | 4/1994 | Cain et al. | 360/113 |
| 6,219,211 B1 | 4/2001 | Gill | 360/324.11 |
| 6,418,000 B1 | 7/2002 | Gibbons et al. | 360/324.11 |
| 6,473,279 B2 | 10/2002 | Smith et al. | 360/324.12 |
| 6,538,856 B1 * | 3/2003 | Gill | 360/319 |
| 6,643,103 B1 | 11/2003 | Trindade | 360/314 |
| 6,927,952 B2 * | 8/2005 | Shimizu et al. | 360/324.12 |
| 6,943,993 B2 * | 9/2005 | Chang et al. | 360/319 |
| 7,002,782 B2 * | 2/2006 | Hasegawa et al. | 360/324.12 |
| 7,027,268 B1 * | 4/2006 | Zhu et al. | 360/314 |
| 2003/0112562 A1 | 6/2003 | Dimitrov et al. | 360/320 |
| 2003/0184918 A1 | 10/2003 | Lin et al. | 360/314 |
| 2003/0235016 A1 | 12/2003 | Gill | 360/324.12 |

FOREIGN PATENT DOCUMENTS

EP 0778 563 A2 11/1997

* cited by examiner

Primary Examiner—A. J. Heinz
Assistant Examiner—Mark Blouin
(74) Attorney, Agent, or Firm—Westman, Champlin & Kelly

(57) ABSTRACT

A magnetic sensor is provided. The magnetic sensor includes a magnetoresistive multi-layered portion that has a first resistance region and a second resistance region. At least two contacts are coupled to the magnetoresistive multi-layered portion. A sensing current flows from a first contact of the at least two contacts to a second contact of the at least two contacts via the first resistance region and the second resistance region of the magnetoresistive multi-layered portion. The first resistance region promotes a primary flow of the sensing current in a first direction substantially perpendicular to surface planes of the layers of the magnetoresistive multi-layered portion, and the second resistance region promotes the primary flow of the sensing current in a second direction substantially in parallel to surface planes of the layers of the magnetoresistive multi-layered portion.

23 Claims, 8 Drawing Sheets

US 7,359,161 B2

MAGNETIC SENSOR THAT COMBINES BOTH CPP AND CIP MODES OF OPERATION

FIELD OF THE INVENTION

The present invention relates generally to magnetic data storage systems, and more particularly but not by limitation to a magnetic sensor, for utilization in such systems, that combines both current-perpendicular-to-plane (CPP) and current-in-plane (CIP) modes of operation.

BACKGROUND OF THE INVENTION

Thin film magnetoresistive (MR) sensors or heads, which are typically formed of various layers deposited upon a substrate, have been utilized in magnetic data storage devices for several years. Physically distinct forms of magnetoresistance such as anisotropic magnetoresistance (AMR), giant magnetoresistance (GMR) and spin tunneling magnetoresistance (TMR) are well known in the art. Magnetic read-back sensor designs have been built using these principles and other effects to produce devices capable of reading relatively high density data from magnetic media. In particular, three general types of MR read-back sensors have been developed: the anisotropic magnetoresistive (AMR) sensor, the giant magnetoresistive (GMR) sensor or GMR spin valve, and the magnetic tunnel junction (MTJ) sensor. Based on the positioning of electrical contacts and geometry of these sensors, a sensing current for detecting magnetic bits of information either passes perpendicular to surface planes of the layers of the sensor or in surface planes of the layers of the sensor. Thus, read-back sensors fall into two distinct categories: current-perpendicular-to-plane (CPP) sensors and current-in-plane (CIP) sensors.

As an ever-increasing amount of information is stored on a magnetic disc, it becomes difficult for MR sensors to separately read the stored information without also reading noise from adjacent stored information. To avoid reading noise from adjacent stored information, in general, a cross-track width of the MR sensor has to be reduced in proportion with increases in areal density. However, a sensitivity of certain CIP sensors, such as CIP GMR spin valves, is proportional to the cross-track width of the sensor. Thus, such CIP sensors may encounter certain limitations when used in very high areal density applications.

The sensitivity of CPP sensors is essentially independent of the cross-track width of the sensor. However, a junction resistance of certain CPP sensors, such as CPP TMR sensors, substantially increases when sensor cross-track width is reduced. This can cause impedance matching problems between the CPP TMR sensor and a preamplifier, which is electrically coupled to the sensor and electrically processes signals from the sensor. CPP GMR sensors, in general, have a very low resistance and therefore may encounter certain limitations.

Embodiments of the present invention provide solutions to these and other problems, and offer other advantages over the prior art.

SUMMARY OF THE INVENTION

A magnetic sensor for reading information from a magnetic medium is provided. The magnetic sensor includes a magnetoresistive multi-layered portion that has a first resistance region in at least a first one of the layers of the magnetoresistive multi-layered portion, and a second resistance region in at least a second one of the layers of the magnetoresistive multi-layered portion. At least two contacts are coupled to the magnetoresistive multi-layered portion. A sensing current flows from a first contact of the at least two contacts to a second contact of the at least two contacts via the first resistance region and the second resistance region of the magnetoresistive multi-layered portion. The first resistance region promotes a primary flow of the sensing current in a first direction substantially perpendicular to surface planes of the layers of the magnetoresistive multi-layered portion, and the second resistance region promotes the primary flow of the sensing current in a second direction substantially in parallel to surface planes of the layers of the magnetoresistive multi-layered portion.

Other features and benefits that characterize embodiments of the present invention will be apparent upon reading the following detailed description and review of the associated drawings.

BRIEF DESCRIPTION OF THE DRAWINGS

FIG. 2 is a cross-sectional view of a piggyback magnetic head that includes a read-back sensor of the present invention.

DETAILED DESCRIPTION OF ILLUSTRATIVE EMBODIMENTS

Figure 1:
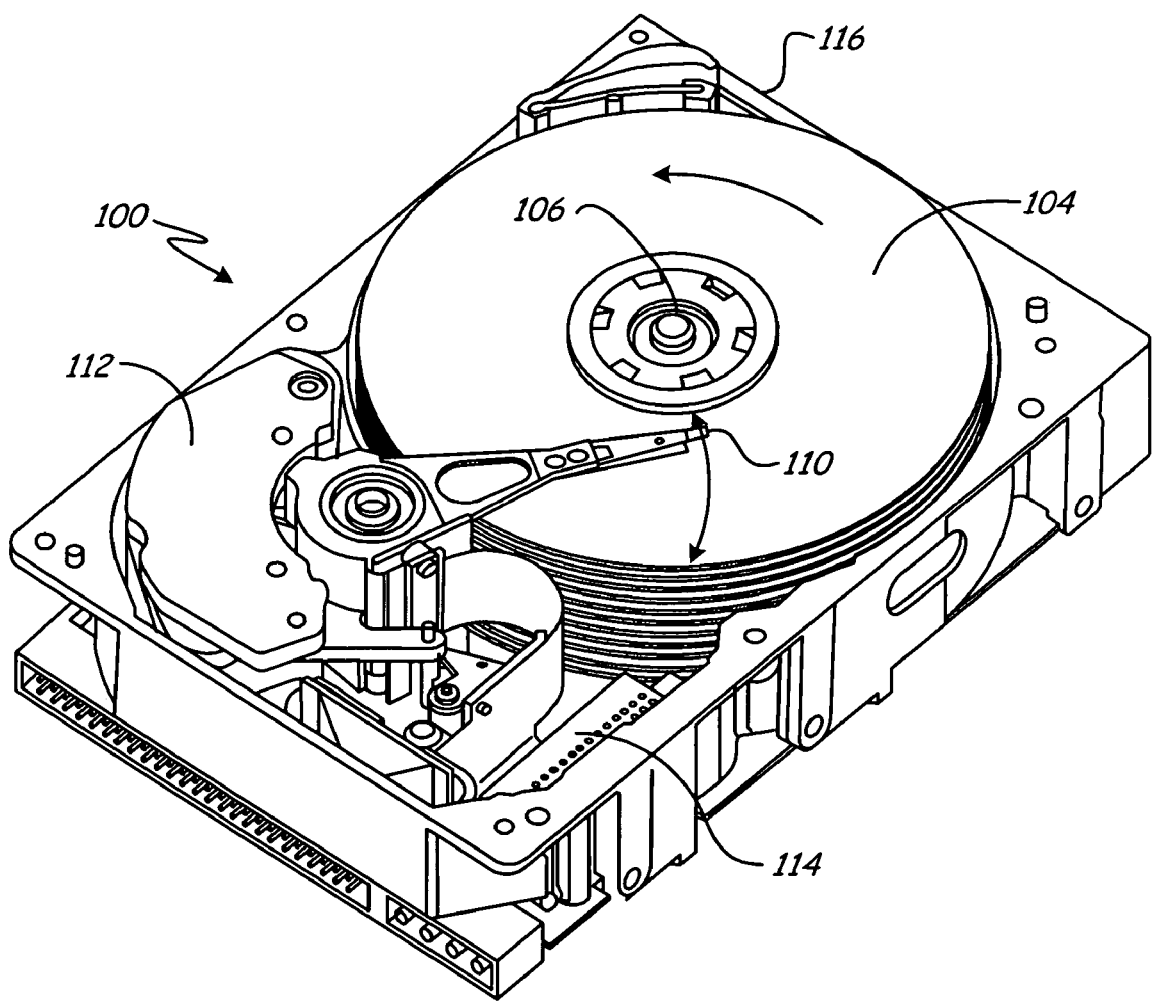
FIGS. 1-1 and 1-2 are diagrammatic and system block views, respectively, of an exemplary disc drive for which embodiments of the present invention are useful.

Referring now to FIG. 1-1, a diagrammatic view of disc drive 100 with which the present invention is useful is shown. Disc drive 100 includes discs 104, spindle 106, spindle motor 126 (shown in FIG. 1-2), magnetic head 110, actuator 112, and board electronics 114. Board electronics 114 include disc controller 124 (shown in FIG. 1-2).

Controller 124 is typically a microprocessor, or digital computer, and is coupled to a host system 118, or another drive controller which controls a plurality of drives. Controller 124 operates based on programmed instructions received from the host system.

Discs 104 are fixed about spindle 106, which is coupled to spindle motor 126 such that energization of spindle motor 126 causes spindle 106 and discs 104 to rotate. When discs 104 rotate, magnetic heads 110 fly above/below discs 104 on thin films of air or liquid that carry magnetic heads 110 for communicating with the respective disc surfaces. Actuator 112 is coupled to controller 124 and is adapted to move heads 110 relative to the surfaces of discs 104 in response to an actuation signal from controller 124.

Magnetic heads 110 may be a piggyback magnetic heads or merged magnetic heads that are employed for recording information in multiple circular tracks on the respective disc surfaces as well as for reading information therefrom.

Figures 1, 2:
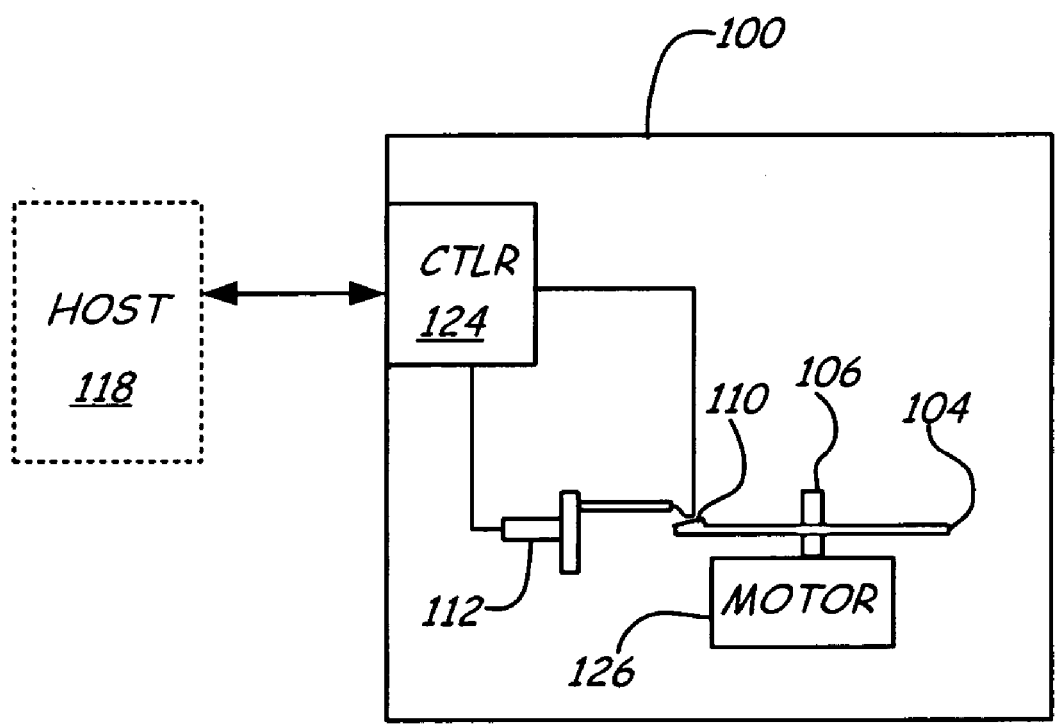
Figure 2:
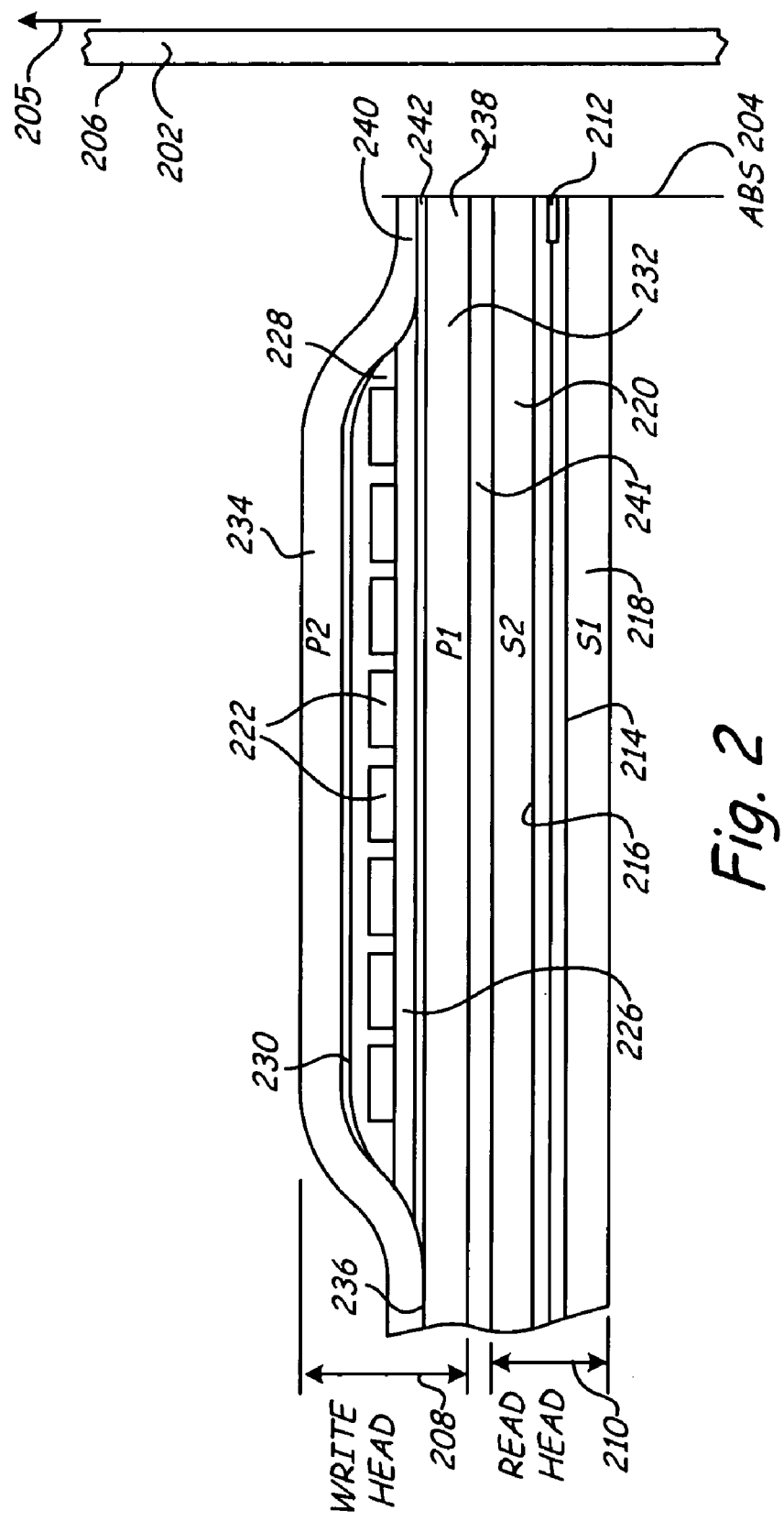

FIG. 2 is a side cross-sectional elevation view of a piggyback magnetic head 200 and a magnetic disc 202 taken along a plane normal to an air bearing surface (ABS) 204 of magnetic head 200. FIG. 2 illustrates magnetic head 200 and its placement relative to magnetic disc 202. ABS 204 of magnetic head 200 faces disc surface 206 of magnetic disc 202. Magnetic disc 202 travels or rotates in a direction relative to magnetic head 200 as indicated by arrow 205. The spacing between air bearing surface 204 and disc surface 206 is preferably minimized while avoiding contact between magnetic head 200 and magnetic disc 202.

Magnetic head 200 includes a write head portion 208 and a read head portion 210, the read head portion employing a read-back sensor 212 of the present invention. Read-back sensor 212 is sandwiched between nonmagnetic nonconductive first and second read gap layers 214 and 216, and the read gap layers are sandwiched between ferromagnetic first and second shield layers 218 and 220. In response to external magnetic fields, the resistance of read-back sensor 212 changes. A sensing current Is conducted through the sensor causes these resistance changes to be manifested as potential changes. These potential changes are then processed as read-back signals by processing circuitry (not shown). First and second shield layers 218 and 220 may serve as leads for the sensor 212 for conducting the sensing current Is to the sensor and may be connected thereto by conductive vias (not shown) which extend through the first and second read gap layers 214 and 216.

Write head portion 208 of magnetic head 200 includes a coil layer 222 sandwiched between first and second insulation layers 226 and 228. A third insulation layer 230 may be employed for planarizing the head to eliminate ripples in the second insulation layer caused by coil layer 222. The first, second and third insulation layers are referred to in the art as an "insulation stack." Coil layer 222 and the first, second and third insulation layers 226, 228 and 230 are sandwiched between first and second pole piece layers 232 and 234. First and second pole piece layers 232 and 234 are magnetically coupled at a back gap 236 and have first and second pole tips 238 and 240 which are separated by a write gap layer 242 at ABS 204. An insulation layer 241 is located between second shield layer 220 and first pole piece layer 232. Since second shield layer 220 and first pole piece layer 232 are separate layers, this head is known as a piggyback head. If head 200 were a merged head, second shield layer 220 and pole piece layer 232 would be a common/merged layer.

As mentioned above, prior art read-back heads fall into two distinct categories, namely, current-perpendicular-to-plane (CPP) and current-in-plane (CIP) sensors, each of which have certain disadvantages that were noted earlier. Under the present invention, a read-back sensor (such as 212) is provided in which the sensing current flows both perpendicular to surface planes of the layers of the sensor and in surface planes of the layers of the sensor. This CPP-CIP configuration of the present invention helps overcome problems related to sensor cross-track width, associated with CIP sensors, and impedance matching problems associated with CPP sensors. The sensitivity of the CPP-CIP sensor of the present invention is substantially independent of the sensor cross-track width. Further, the CPP-CIP sensor has a moderate resistance, which more closely matches that of a preamplifer employed in current disc drives than either a CPP TMR sensor or a CPP GMR sensor.

Figure 3:
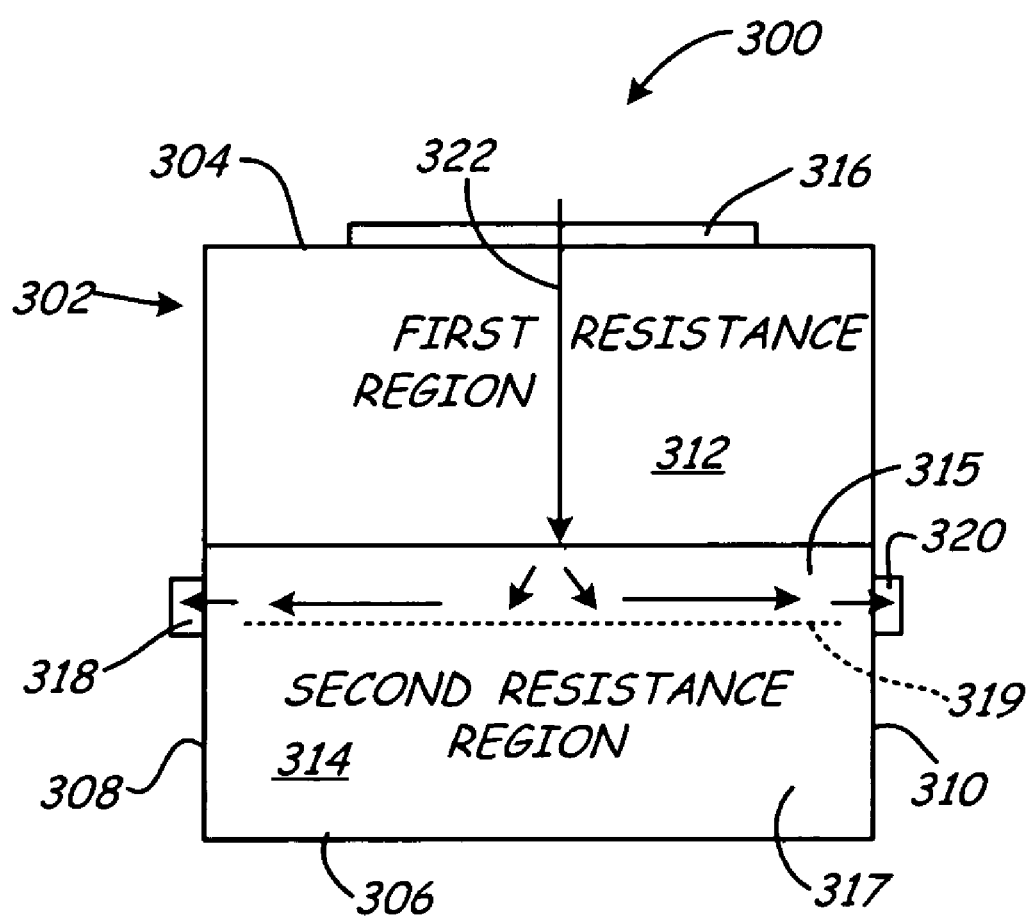
FIG. 3 is an air bearing surface view of a magnetic sensor in accordance with an embodiment of the present invention.

FIG. 3 is an air bearing surface view of a magnetic sensor 300 in accordance with an embodiment of the present invention. Magnetic sensor 300 includes a magnetoresistive multi-layered portion 302 having an upper surface 304, a lower surface 306 and multiple sides (such as 308, 310). Multi-layered portion 302 includes a first resistance region 312 in at least a first one of its layers and second resistance region 314 in at least a second one of its layers. An end contact (such as 316) is disposed on one of upper surface 304 and lower surface 306. End contact 316 is in contact with first resistance region 312. At least one side contact (such as 318, 320) is disposed on at least one side (such as 308, 310) of the multiple sides. Side contacts 318 and 320 are proximate, or in contact with, second resistance region 314.

In embodiments of the present invention, a specific resistance (resistivity) of a material from which first resistance region 312 is formed is greater than a specific resistance of a material from which a first portion 315 of second resistance region 314 proximate first resistance region 312 is formed. Consequently, in operation, a sensing current 322 initially flows from end contact 312 through first resistance region 312 in a direction substantially perpendicular to surfaces planes of the layers of magnetoresistive multi-layered portion 302. Sensing current 322 then changes direction in portion 315 of second resistance region 314 and flows in surface planes of the layers of multi-layered portion 302 and subsequently into side contacts 318 and 320. Second portion 317 of second resistance region 314 is formed of a material (or materials) that has a specific resistance that is higher than that of the material used for first portion 315. This helps maintain a flow of sensing current 322 in a CIP direction in first portion 315 of second resistance region 314. Therefore, sensor 300 combines both CPP and CIP modes of operation. Note that, in FIG. 3, first portion 315 and second portion 317 of second resistance region 314 are separated by dashed line 319.

Figure 4:
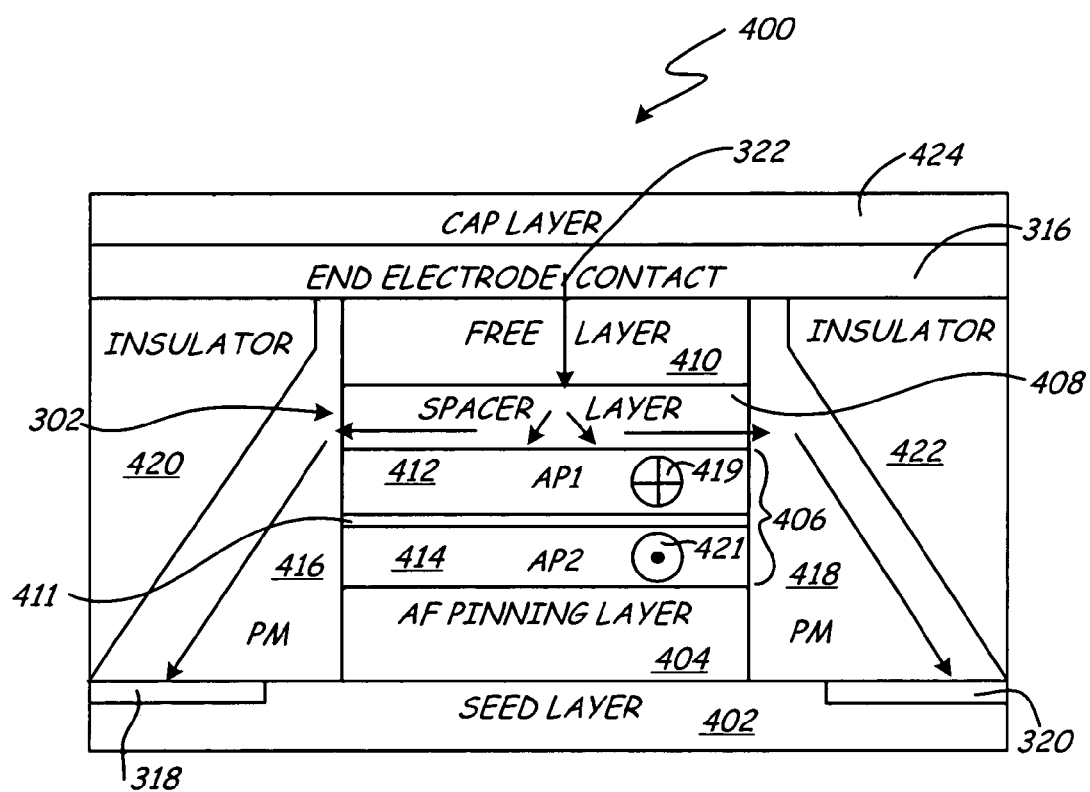
FIGS. 4 and 5 air bearing surface views of magnetic sensors in accordance with more specific embodiments of the present invention.
Figure 5:
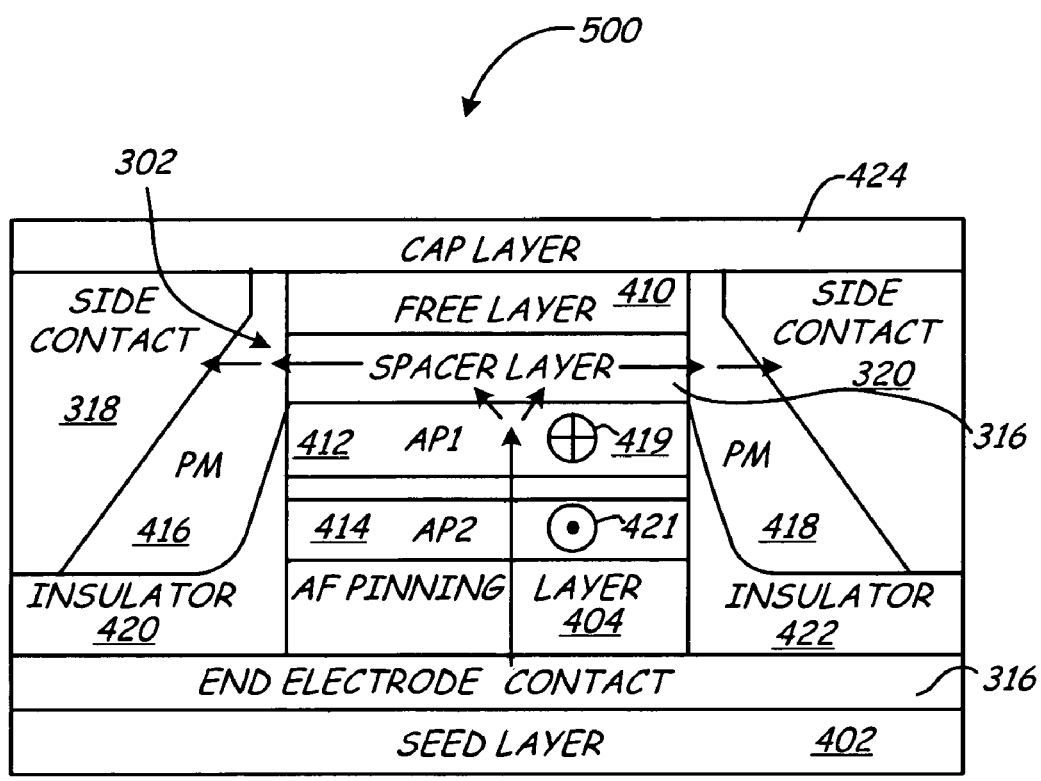

FIGS. 4 and 5 show more specific embodiments of read-back sensors of the present invention. The same reference numerals are used to represent the same or similar elements of read-back sensors 300 (FIG. 3), 400 (FIG. 4) and 500 (FIG. 5). Sensor 400, shown in FIG. 4, comprises (with a thickness range for each layer in parenthesis) a seed layer (10-20 Å) 402, that is formed over a substrate (not shown), a anti-ferromagnetic (AF) pinning layer (35-80 Å) 404, a laminated antiparallel (AP)-pinned layer (10-50 Å) 406, an electrically-conducting spacer layer (10-20 Å) 408, a free layer (15-35 Å) 410, an end electrode contact 316, side contacts 318 and 320, permanent magnets 416 and 418, insulators 420 and 422 and cap layer 424. Laminated AP-pinned layer 406 comprises a first ferromagnetic layer (10-30 Å) 410 (AP1) and a second ferromagnetic layer (10-30 Å) 412 (AP2) separated from each other by an antiparallel coupling (APC) layer (2-20 Å) 411 of nonmagnetic material. The two ferromagnetic layers 410 and 412 in laminated AP-pinned layer 406 have their magnetization directions oriented antiparallel, as indicated by a tail of an arrow 419 pointing into the plane of the paper and a head of an arrow 421 pointing out of the plane of the paper.

In general, seed layer 402 is any layer deposited to modify the crystallographic texture or grain size of the subsequent layers. Seed layer 402 may be formed of tantalum (Ta), zirconium (Zr) or aluminum oxide ($Al_2O_3$), for example. AF-pinning layer 404 may be formed of manganese-platinum (MnPt), nickel-manganese (NiMn) or iridium-manganese (IrMn), for example. Free layer 410, which is separated from laminated AP-pinned layer 406 by nonmagnetic, electrically-conducting, spacer layer 408, may be formed of a single layer of a cobalt-iron (CoFe), for example. Spacer layer 404 is preferably made of copper (Cu) although it may also be made of gold (Au) or silver (Ag). First ferromagnetic layer 410 (AP1) and second ferromagnetic layer 412 (AP2) may both be formed of CoFe. APC layer 411 may be made of Ruthenium (Ru). Permanent magnets (PM) 416 and 418 may be made of a cobalt-chromium-platinum (CoCrPt) alloy. Insulators 420 and 422 may be formed of Al$_2$O$_3$. Cap or protection layer 424 may be formed of tantalum (Ta) or Al$_2$O$_3$. Contacts 316, 318 and 320 may be formed of electrically conductive materials such as Cu, Ag, Au, etc., or an alloy of metals that is electrically conductive.

In Sensor 400, AF-pinning layer 404, laminated AP-pinned layer 406, spacer layer 408 and free layer 410 form multi-layered-portion 302. Also, in sensor 400, free layer 410 constitutes the first resistance region (equivalent to region 312 of FIG. 3). Spacer layer 408, laminated AP-pinned layer 406 and AF-pinning layer 404 constitute the second resistance region (equivalent to region 314 of FIG. 3). Spacer layer forms the first portion of the second resistance region (equivalent to region 315 of FIG. 3) and laminated AP-pinned layer 406 and AF-pinning layer 404 form the second portion of the second resistance region (equivalent to region 317 of FIG. 3). A specific resistance of the material of free layer 410 ($\rho_{FL}$) is substantially greater than a specific resistance of the material of spacer layer 408 ($\rho_{SL}$) and less than a specific resistance of a material of permanent magnets 416 and 420 ($\rho_{PM}$). The following shows the relationship between the specific resistance values of the three regions mentioned above.

$$\rho_{SL} \ll \rho_{FL} < \rho_{PM} \qquad \text{Relation 1}$$

In general, specific resistance values for materials utilized for layers 404 and 406 are also greater than $\rho_{SL}$.

In operation, the sensor configuration of FIG. 4 causes sensing current 322 to initially flow from end contact 312 through free layer 410 in a direction substantially perpendicular to surfaces planes of the layers of magnetoresistive multi-layered portion 302. Sensing current 322 then changes direction in spacer layer 408 and flows in surface planes of the layers of multi-layered portion 302 and subsequently into side contacts 318 and 320 via PM regions 416 and 418.

FIG. 5 shows a read-back sensor similar to that of FIG. 4. However, in sensor 500, end contact 502 is in contact with a bottom surface of magnetoresistive multi-layered portion 302. Also, positions of insulators 420 and 422 and side contacts 318 and 320 are interchanged. In sensor 500, AF-pinning layer 404 and laminated AP-pinned layer 406 form the first resistance region. Spacer layer 408 and free layer 410 form the second resistance region. Spacer layer 408 forms the first portion of the second resistance region and free layer 410 forms the second portion of the second resistance region. As can be seen in FIG. 5, insulators 420 and 422 extend along the sides of the layers of the first resistance region. A specific resistance of the material from which insulators 420 and 422 are formed is substantially greater than specific resistances of the materials of first resistance region (layers 404 and 406 in FIG. 5). The relationship between specific resistance values of spacer layer 408, free layer 410 and PM regions 416 and 418 is in accordance with Relation 1 above.

In operation, the sensor configuration of FIG. 5 causes sensing current 322 to initially flow from end contact 312 through AF-pinning layer 404 and laminated AP-pinned layer 406 in a direction substantially perpendicular to surfaces planes of the layers of multi-layered portion 302. Sensing current 322 then changes direction in spacer layer 408 and flows in surface planes of the layers of magnetoresistive multi-layered portion 302 and subsequently into side contacts 318 and 320 via PM regions 416 and 418.

In general, the above-described sensors (such as 300, 400 and 500) of the present invention may be fabricated in a magnetron sputtering or an ion beam sputtering system to sequentially deposit the multi-layered structures shown in FIGS. 3, 4 and 5.

Figure 6:
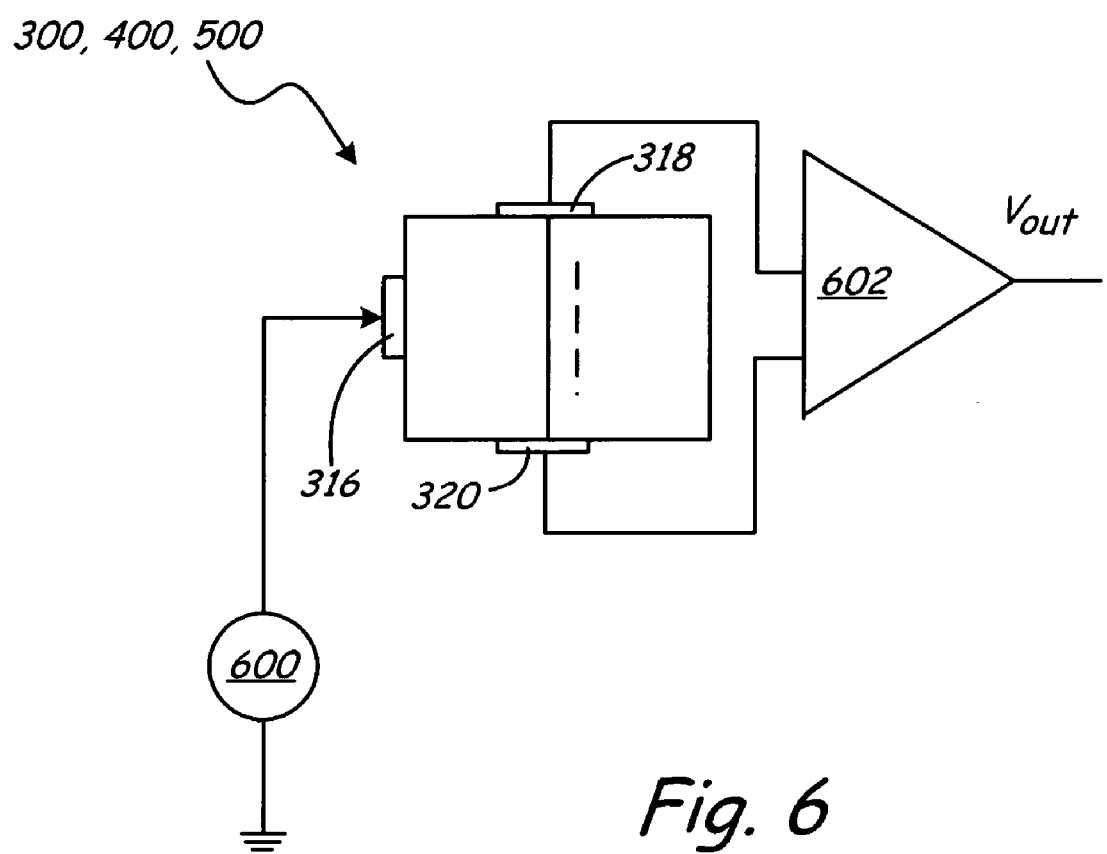
FIG. 6 is a diagrammatic view of a three-terminal device formed using a sensor of the present invention.
Figure 7:
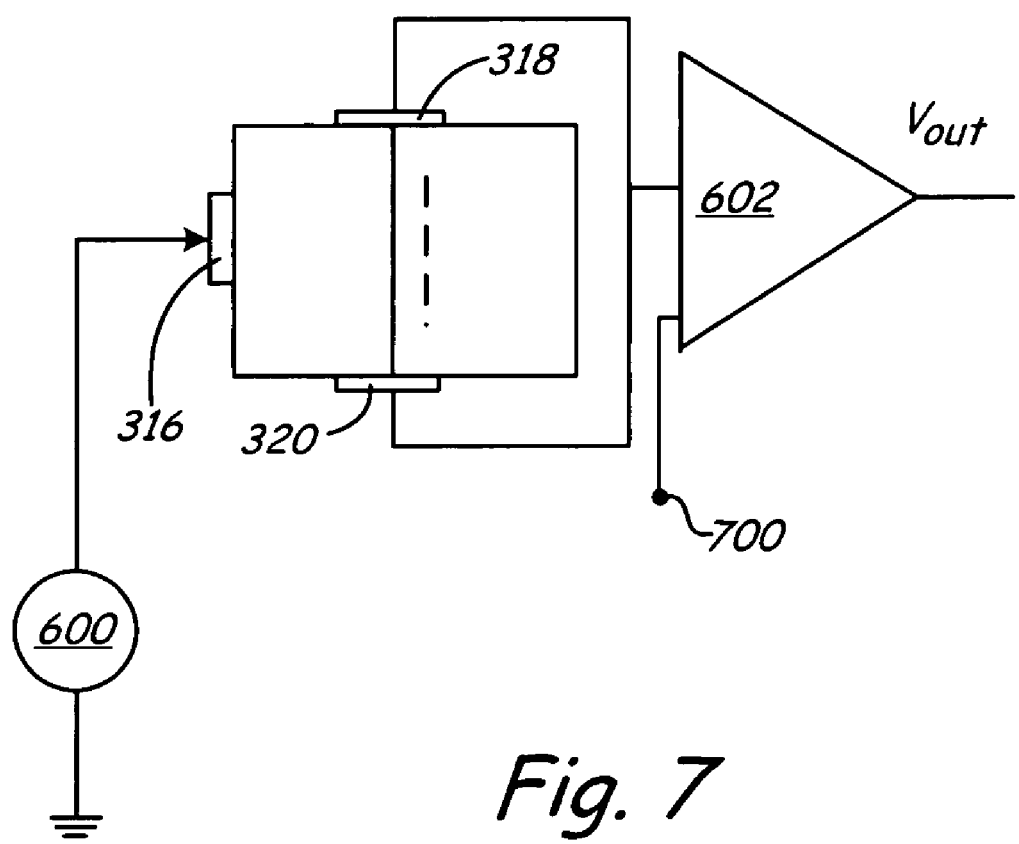
FIG. 7 is a diagrammatic view of a two-terminal device formed using a sensor of the present invention.

FIGS. 6 and 7 show three terminal and two terminal devices formed from the sensors (such as 300, 400 and 500) of the present invention. In FIG. 6, end contact 316 is connected to current/voltage source 600, that provides sensing current $I_s$, and each side contact 318, 320 is connected to a separate input of a preamplifier 602, which amplifies signals produced due to resistance changes in sensor 300, 400, 500. Since each of the three contacts 316, 318 and 320 is connected to a separate input/output of source 600 and preamplifier 602, the sensor of FIG. 6 (such as 300, 400, 500) forms a three-terminal device. Source 600 and preamplifier 602, which is typically a differential amplifier, are mounted on a printed circuit board (PCB) (not shown) included in disc drive 100. In FIG. 7, both side contacts 318 and 320 are coupled to a single input of preamplifier 602, thereby forming a two-terminal device. Node 700 is connected additional circuitry, which is not shown in the interest of simplification. It will be appreciated by those skilled in the art that proper biasing of the CPP-CIP magnetic sensor of the present invention is essential to achieve response from both the CPP and CIP structures within the sensor. This is important because current should flow both through the device and across the device at a level that substantially maximizes the combined response from the CPP-CIP structure.

It is to be understood that even though numerous characteristics and advantages of various embodiments of the invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. For example, the particular elements may vary depending on the particular application for the magnetic sensor while maintaining substantially the same functionality without departing from the scope and spirit of the present invention. In addition, although the preferred embodiment described herein is directed to a magnetic sensor, which combines both CPP and CIP modes of operation, for a disc storage system, it will be appreciated by those skilled in the art that the teachings of the present invention can be applied to any type of storage system or device that senses magnetically, without departing from the scope and spirit of the present invention. Also, any combination of layers, formed of different materials, may be used to form a sensor that combines both CPP and CIP modes of operation, without departing from the scope and spirit of the present invention.

What is claimed is:

1. A magnetic sensor comprising:
    a magnetoresistive multi-layered portion comprising:
        a first resistance region in at least a first one of the layers of the magnetoresistive multi-layered portion; and
        a second resistance region in at least a second one of the layers of the magnetoresistive multi-layered portion; and
    at least three contacts coupled to the magnetoresistive multi-layered portion,
    wherein the first resistance region, the second resistance region and the at least three contacts are so disposed and arranged that a sensing current flows from a first contact of the at least three contacts to a second and third contact of the at least three contacts via the first resistance region and the second resistance region of the magnetoresistive multi-layered portion, and
    wherein the first resistance region promotes a primary flow of the sensing current in a first direction substantially perpendicular to surface planes of the layers of the magnetoresistive multi-layered portion, and wherein the second resistance region promotes the primary flow of the sensing current in a second direction substantially in parallel to surface planes of the layers of the magnetoresistive multi-layered portion.

2. The magnetic sensor of claim 1 wherein a resistivity of a material from which the first resistance region is formed is greater that a resistivity of a material from which at least a portion of the second resistance region is formed.

3. The magnetic sensor of claim 1 wherein the magnetoresistive multi-layered portion comprises an upper surface, a lower surface and a plurality of sides, and wherein the first contact is an end contact disposed on one of the upper and lower surfaces and in contact with the first resistance region, and wherein the second and third contact are side contacts disposed proximate each side of the plurality of sides and proximate the second resistance region.

4. The magnetic sensor of claim 3 wherein the first resistance region comprises a free layer of the magnetoresistive multi-layered portion, and wherein the second resistance region comprises a spacer layer of magnetoresistive the multi-layered portion.

5. The magnetic sensor of claim 4 further comprising a permanent magnet between the side contacts and the second resistance region.

6. The magnetic sensor of claim 3 wherein the first resistance region comprises an anti-ferromagnetic pinning layer and a laminated antiparallel pinned layer of the magnetoresistive multi-layered portion, and wherein the second resistance region comprises a spacer layer of the magnetoresistive multi-layered portion.

7. The magnetic sensor of claim 6 further comprising a permanent magnet between the side contact and the second resistance region, the permanent magnet being separated from the first resistance region by an insulator.

8. The magnetic sensor of claim 1 wherein the second resistance region comprises a spacer layer, which is formed of an electrically conductive metal selected from the group consisting of copper (Cu), silver (Ag) and gold (Au).

9. A three-terminal read-back sensor comprising the magnetic sensor of claim 1.

10. A method of forming a magnetic sensor, the method comprising:
  (a) forming a magnetoresistive multi-layered portion comprising:
    a first resistance region in at least a first one of the layers of the magnetoresistive multi-layered portion; and
    a second resistance region in at least a second one of the layers of the magnetoresistive multi-layered portion; and
  (b) coupling at least three contacts to the magnetoresistive multi-layered portion,
  wherein the first resistance region, the second resistance region and the at least three contacts are so formed and arranged that a sensing current flows from a first contact of the at least three contacts to a second and third contact of the at least three contacts via the first resistance region and the second resistance region of the magnetoresistive multi-layered portion, and
  wherein the first resistance region promotes a primary flow of the sensing current in a first direction substantially perpendicular to surface planes of the layers of the magnetoresistive multi-layered portion, and wherein the second resistance region promotes the primary flow of the sensing current in a second direction substantially in parallel to surface planes of the layers of the magnetoresistive multi-layered portion.

11. The method of claim 10 wherein a resistivity of a material from which the first resistance region is formed is greater that a resistivity of a material from which the second resistance region is formed.

12. The method of claim 10 wherein the magnetoresistive multi-layered portion comprises an upper surface, a lower surface and a plurality of sides, and wherein the first contact is an end contact formed on one of the upper and lower surfaces and in contact with the first resistance region, and wherein the second contact and third is a side contact formed proximate a side of the plurality of sides and proximate the second resistance region.

13. The method of claim 12 wherein the first resistance region comprises a free layer of the magnetoresistive multi-layered portion, and wherein the second resistance region comprises a spacer layer of the magnetoresistive multi-layered portion.

14. The method of claim 13 further comprising forming a permanent magnet between the side contacts and the second resistance region portion.

15. The method of claim 12 wherein the first resistance region comprises an anti-ferromagnetic pinning layer and a laminated antiparallel pinned layer of the magnetoresistive multi-layered portion, and wherein the second resistance region comprises a spacer layer of the magnetoresistive multi-layered portion.

16. The method of claim 15 further comprising forming a permanent magnet between the side contact and the second resistance region, the permanent magnet being separated from the first resistance region by an insulator.

17. The method of claim 10 wherein the second resistance region comprises a spacer layer, which is formed of an electrically conductive metal selected from the group consisting of Cu, Ag and Au.

18. The method claim 10 wherein each of the at least two contacts is formed of an electrically conductive metal selected from the group consisting of Cu, Ag and Au.

19. A multi-layered magnetic sensor comprising:
  a first resistance region in at least a first one of the layers of the multi-layered magnetic sensor, the first resistance region promoting a primary flow of a sensing current in a current-perpendicular-to-plane (CPP) direction; and
  a second resistance region in at least a second one of the layers of the multi-layered magnetic sensor, the second resistance region promoting the primary flow of the sensing current in a current-in-plane (CIP) direction, further comprising at least three contacts, which are so disposed and arranged that the sensing current flows from a first contact of the at least three contacts to a second and third contact of the at least three contacts via the first resistance region and the second resistance region of the multi-layered magnetic sensor.

20. The magnetic sensor of claim 19 wherein a resistivity of a material from which the first resistance region is formed is greater that a resistivity of a material from which at least a portion of the second resistance region is formed.

21. The magnetic sensor of claim 19 wherein the first resistance region comprises a free layer, and wherein the second resistance region comprises a spacer layer.

22. The magnetic sensor of claim 21 further comprising a permanent magnet between the second contact and the second resistance region.

23. The magnetic sensor of claim 19 wherein the first resistance region comprises an anti-ferromagnetic pinning layer and a laminated antiparallel pinned layer, and wherein the second resistance region comprises a spacer layer.

* * * * *

UNITED STATES PATENT AND TRADEMARK OFFICE
CERTIFICATE OF CORRECTION

PATENT NO.        : 7,359,161 B2                                                  Page 1 of 1
APPLICATION NO.   : 10/880705
DATED             : April 15, 2008
INVENTOR(S)       : Shaoping Li et al.

It is certified that error appears in the above-identified patent and that said Letters Patent is hereby corrected as shown below:

Title Page
Item (75) Inventors: delete "Bloomington" and insert --Eden Prairie--

Column 8
Line 10: delete "second contact and third" and insert --second and third contact--

Signed and Sealed this

Fourteenth Day of July, 2009

JOHN DOLL
*Acting Director of the United States Patent and Trademark Office*